United States Patent [19]

Betterton et al.

[11] Patent Number: 4,678,362
[45] Date of Patent: Jul. 7, 1987

[54] SHAFT RETAINER

[75] Inventors: Joseph T. Betterton, Arab; Alfred H. Glover, Decatur, both of Ala.

[73] Assignee: Chrysler Motors Corporation, Highland Park, Mich.

[21] Appl. No.: 851,745

[22] Filed: Apr. 14, 1986

[51] Int. Cl.$^4$ .............................................. F16B 7/08
[52] U.S. Cl. ..................... 403/373; 403/233; 24/681
[58] Field of Search ............ 403/233, 234, 373, 235, 403/237, 311, 314, 206, 247, 70; 24/662, 681

[56] References Cited

U.S. PATENT DOCUMENTS

| 832,044 | 10/1906 | Dickason | 403/311 |
|---|---|---|---|
| 1,193,814 | 8/1916 | Norris | 403/311 |
| 1,700,070 | 1/1929 | Musgrove et al. | 403/331 |
| 3,449,002 | 6/1969 | Bernard | 403/373 |

FOREIGN PATENT DOCUMENTS 517708  8/1976  U.S.S.R. .................. 403/311

Primary Examiner—Cornelius J. Husar
Assistant Examiner—Joseph A. Fischetti
Attorney, Agent, or Firm—Kenneth H. MacLean, Jr.

[57] ABSTRACT

A shaft retainer or support means adapted to encircle a midportion of a shaft without need of axial travel over the shaft end portions includes a body portion having a circular channel means of more than about 180 degrees circumference so that the shaft can be inserted laterally into the channel means by slight flexing which is of sufficiently flexible material to allow this. This body portion also includes a second channel extending parallel to the circular channel and interconnected therewith for receiving a locking key member which axially moves along the shaft in the second channel means thereby completing a 360 degree engagement with the circumference of the midportion of the shaft. The preferred embodiment also includes axially locking means for the slideable key member to maintain it in a desired axial position within the second channel of the body.

2 Claims, 4 Drawing Figures

SHAFT RETAINER

BACKGROUND OF THE INVENTION

In many applications, it is desirable to attach a member to the midportion of a shaft, the ends of the shaft being preformed with bends and other configurations so as to prohibit inserting a member on the shaft over either of the end portions.

The subject shaft retainer includes a body portion having a generally circular aperture therethrough for engaging the midportion of a shaft over more than 180 degrees of its circumference. The body portion of the retainer is formed of somewhat flexible plastic material which is resilient enough to permit the body portion to be fitted over the midportion of the shaft and encircle the shaft's circumference more than 180 degrees. The body of the retainer also includes a second channel means interconnected with the first for providing access to the circular channel means by the midportion of the shaft. The second channel means also receives a locking key member which is similarly configured in a cross-sectional aspect to the second channel. Together with the circular profile of the first channel means, the key member provides a 360 degree engagement with the circumference of the shaft's midportion. Further, the body member of the retainer includes a window to one surface of the key member which has an upstanding portion or projection formed at that location. This projection extends into the window so as to lock the slideable key member in a desired axial position. When it is desirable to remove the member key by axial movement thereof, the window is used to provide access to the projection is depressed so that the key member will axially slide within the second channel means of the body member and, thus, be disengaged from the body member.

SUMMARY OF THE INVENTION

It is desirable to provide a shaft retainer means which engages the midportion of a shaft without travel over the shaft ends, particularly where the end portions of the shaft do not permit sliding engagement of the retainer member along the shaft. Likewise, it is clear that the body of the retainer can be formed of sufficiently flexible material to permit the midportion of the shaft to be inserted into a circular channel means so that resultantly more than 180 degrees of the body engages the midportion of the shaft. Also, a second channel interconnected with the first channel can be formed in the retainer body to accept an axially movable locking member which has a curved surface portion engaging the midportion of the shaft so that the full 360 degrees of the shaft is engaged by the retainer body and by the locking key member. An axially locking means is provided between the key member and the body portion to prevent undesired axial movements therebetween.

An object of the invention, therefore, is to provide a shaft retainer with a body portion directly applied to the shaft midportion without axial insertion of either end portion.

A further object of the invention is to provide a sufficiently flexible shaft retainer for insertably receiving the midportion of a shaft and including a generally circular channel means configured to engage more than 180 degrees of the shaft midportion and with interconnected second channel means permitting the axial insertion of a locking member which also engages the shaft midportion to provide 360 degrees of shaft engagement.

A further object of the invention is to provide a shaft retainer for engaging the midportion of a shaft and including a body portion and an axially movable locking member which engages a channel means of the body portion to fully encircle the shaft and including locking means between the retainer body and the locking member to prevent undesired axial disengagement therebetween.

Further objects and advantages of the subject shaft retainer will be more readily apparent from a reading of the following detailed description of an embodiment, reference being had to the accompanying drawings in which a preferred embodiment is illustrated.

IN THE DRAWINGS

DESCRIPTION OF AN EMBODIMENT

Figure 1:
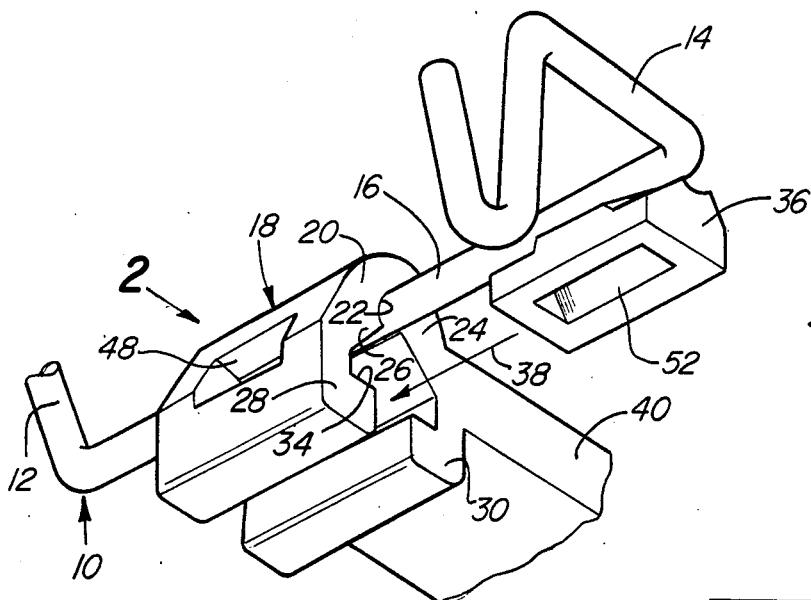
FIG. 1 is a perspective view of the midportion of a shaft and with the subject retainer body and locking key prior to final assembly.
Figure 2:
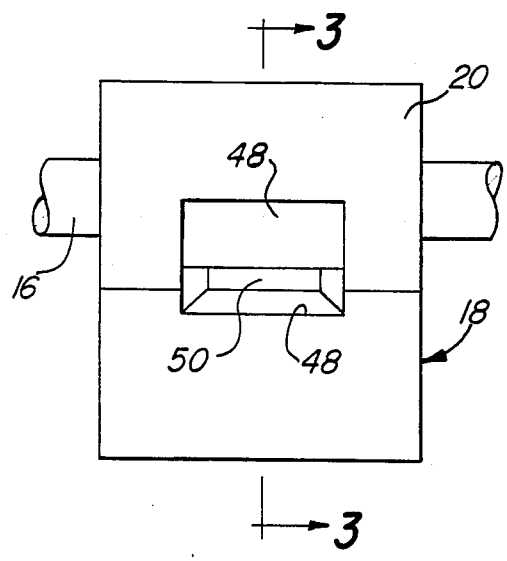
FIG. 2 is a view of the shaft and retainer member looking in the direction of arrow 2 in FIG. 1.
Figure 3:
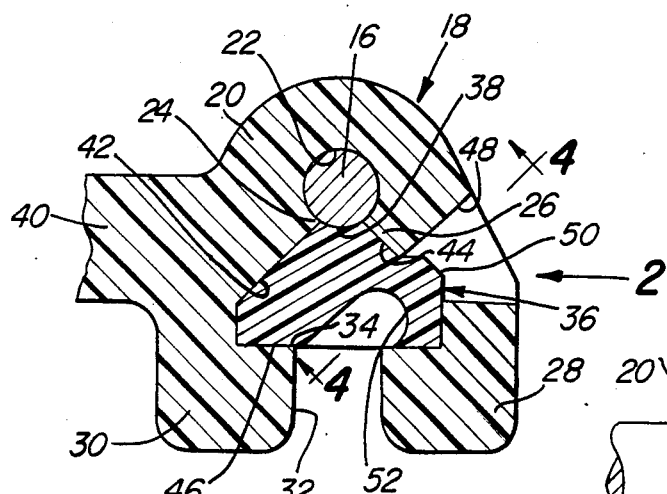
FIG. 3 is an elevational and sectional view of the shaft and retainer taken along section line 3—3 in FIG. 2 therein and looking in the direction of the arrow.

In FIG. 1, a shaft 10 is illustrated with a circular cross-section as best revealed in FIG. 3. Shaft 10 has end portions 12 and 14 which are oddly configured as illustrated in FIG. 1. The shaft 10 also has a substantially straight midportion 16 around which a shaft retainer member 18 extends. The retainer member 18 includes a body portion 20 mold formed of an elastomeric material which is somewhat flexible, but sufficiently rigid to provide support for the midportion 16 of the shaft 10. The body portion 20 includes a first channel means 22 extending therethrough and configured in a circular cross-section as shown in FIG. 3 and of the same diameter as the midportion 16 of shaft 10. It is noted that in FIG. 3, the channel means 22 has the same circular configuration as the shaft and extends about the circumference of the midportion 16 to an extent greater than 180 degrees, but less than the full 360 degrees. As previously mentioned, the body 20 of the retainer 18 is of sufficiently flexible elastomeric material to permit the midportion 16 of the shaft 10 to be inserted within the channel means 22 by slight flexure of the body portion. This causes the channel 22 to open enough for shaft portion 16 by temporary distortion of portions 24 and 26 of the body portion. The resiliency of the body portion 20 permits the portions 24 and 26 to return to their original position to provide contact with the shaft portion 16 over more than 180 degrees of its circumference.

The retainer body 20 also includes downwardly projecting portions or legs 28, 30 each having a generally L-shaped cross-section shown in FIG. 3. The portions 28 and 30 form a channel 32 therebetween to permit the insertion of the midportion 16 of shaft 10 into the retainer 18. Likewise, the portions 28, 30 also define a substantially triangularly shaped channel means 34 which extends generally parallel with the circular channel means 22. Channel means 34 is interconnected with channel means 22 between portions 24 and 26 and is adapted to receive an axially movable lock key member 36. Member 36 has a cross-section which corresponds to the cross-sectional shape of the second channel means 34. The axially movable key member 36 slides axially in the direction of arrow 38 shown in FIG. 1 so as to essentially fill the second channel means 34. The member 36 includes a curved upper edge portion 38 which engages a portion of the circumference of shaft 10. Together, the surfaces of the first channel means 22 and the arcuate edge portion 38 engage the full 360 degrees of shaft circumference. Thus, the shaft 10 is fully supported by the retainer means 18 including key member 36. The body portion 20 of the retainer 18 may also include a projecting portion or tab 40 therefrom adapted to be attached to some structure for completing the support of the retainer and the shaft.

Figure 4:
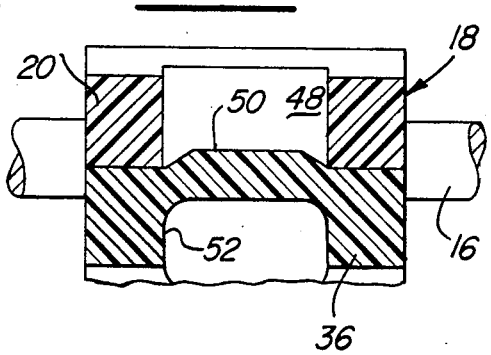
FIG. 4 is a partial sectioned view of the shaft and retainer taken along section line 4—4 in FIG. 3 and looking in the direction of the arrows.

Specifically, the second channel means 34 includes inclined side surfaces 42 and 44 which are inclined toward one another as shown in FIG. 3. Surfaces 42, 44 approach the upper curved surface 38 which engages the midportion 16 of shaft 10. Side surfaces 42 and 44 diverge toward a base including the bottom surface 46 of the member 36. It can be seen from FIG. 1 that the key member 36 slides in the axial direction with respect to midportion 16 of shaft 10 in the second channel means 34. When the shaft is fully supported within the retainer body 20, the key member 36 should be substantially axially fixed within the body portion 20. In other words, it would be undesirable to permit the key member 36 to work its way out of the channel 34 during rotation or other movements of the shaft 10. Therefore, a window means or port 48 is provided in the body portion 20 which intersects the channel 34 as shown in FIG. 3. A raised projection means 50 is mold-formed on side 44 of the key member 36. When in the assembled position shown in FIGS. 3 and 4, the projection 50 extends into the window 48 thus retaining the key member 36 in an axial direction within the body portion 20.

We have seen that the projection 50 on the key member 36 axially locks the member 36 to the retainer 18. However, it is desirable to also selectively disengage the key member 36 from the retainer body 20. For this purpose, key member 50 has a hollow formed by a molded recess or channel 52 extending from the bottom surface 46 of member 36. The channel 52 is directed toward the underside of projection 50 so that the thickness of material beneath the projection 50 is relatively thin therebelow. The member 36 is mold-formed of sufficiently flexible material so that access through window 48 permits depression of the projecting portion 50 of member 36 sufficiently to permit the axial movement of member 36 along the channel 34 to the position shown in FIG. 1 which then permits shaft 10 to be disengaged from the retainer 18.

A particular embodiment of a shaft retainer which permits mounting of a shaft without insertion of its end portions through a retainer body has been described and illustrated. Although only one embodiment of the invention has been illustrated and described, modifications to the embodiment may be made without falling outside the scope of the invention as described in the following claims.

We claim:

1. A shaft retainer adapted to encircle a shaft midportion without need of axial movement of the shaft end portions through the retainer, comprising:

a body portion of the retainer having circularly configured first channel means extending therethrough and laterally opened sufficiently to receive the midportion of the shaft;

the body portion of the retainer being of sufficiently flexible material to laterally insert the midportion of the shaft into the first channel means for engagement between the retainer body and the shaft over more than 180 degrees of the shaft circumference;

the body portion further having a pair of substantially parallel leg portions which form an aperture therebetween through which the midportion of the shaft can be inserted prior to insertion into the first channel means, the leg means also defining a second channel means between the aperture and the first channel means which is interconnected with the first channel means and the aperture to define a substantially triangularly configured aperture through the body member in a cross-sectional aspect thereof;

a lock key member having a substantially triangular configuration conforming to the configuration of the second channel means so that the lock key member may slide within the body portion in the axial direction of the shaft midportion through the second channel means, the lock key member having an upper curved surface portion adapted to complement the surface of the circular first channel means to provide a full 360 degrees supporting contact with the midportion of the shaft;

window means formed in the body portion of the retainer extending to the second channel means therein;

the lock key member having a raised surface means or projection thereon in a position to permit extension into the window means of the retainer body when the lock key member is in a desired axial position along the shaft when in an assembled position.

2. The shaft retainer described in claim 1 in which the lock key means provides a hollowed interior projecting beneath the raised surface so that the material thickness therebeneath is relatively thin compared to the body of the lock key member whereby the area of the raised projection is relatively flexible and may be easily depressed by access through the window means of the retainer body so that the lock key member may be axially moved in the second channel means to an unassembled position.

* * * * *